United States Patent [19]

Robeson et al.

[11] 4,293,670

[45] Oct. 6, 1981

[54] BLENDS OF POLY(ARYL ETHER) RESINS AND POLYETHERIMIDE RESINS

[75] Inventors: Lloyd M. Robeson, Whitehouse Station; Markus Matzner, Edison; Louis M. Maresca, Belle Mead, all of N.J.

[73] Assignee: Union Carbide Corporation, New York, N.Y.

[21] Appl. No.: 106,505

[22] Filed: Dec. 26, 1979

[51] Int. Cl.³ .................. C08L 81/06; C08L 79/08
[52] U.S. Cl. .................. 525/436; 525/905; 525/906; 525/928
[58] Field of Search .............. 525/436, 905, 906

[56] References Cited

U.S. PATENT DOCUMENTS

| | | | |
|---|---|---|---|
| 3,657,177 | 4/1972 | Adesko | 525/906 |
| 3,657,385 | 4/1972 | Matzner | 525/906 |
| 3,658,938 | 4/1972 | Kwiatkowski | 525/436 |
| 3,663,507 | 5/1972 | Vogel | 525/436 |
| 3,773,718 | 11/1973 | Klebe | 525/436 |
| 3,833,544 | 9/1974 | Takekoshi | 528/28 |
| 3,838,097 | 9/1974 | Wirth | 260/49 |
| 3,847,867 | 11/1974 | Heath | 260/47 CP |
| 4,017,511 | 4/1977 | Williams | 528/188 |
| 4,024,110 | 5/1977 | Takekoshi | 528/170 |
| 4,107,147 | 8/1978 | Williams | 528/172 |

*Primary Examiner*—Paul Lieberman
*Attorney, Agent, or Firm*—Donald M. Papuga

[57] ABSTRACT

Described herein are molding compositions of blends of a poly(aryl ether) resin and a polyetherimide resin. These compositions have improved environmental stress crack resistance.

9 Claims, No Drawings

BLENDS OF POLY(ARYL ETHER) RESINS AND POLYETHERIMIDE RESINS

BACKGROUND OF THE INVENTION

This invention is directed to a molding composition comprising blends of a poly(aryl ether) resin and a polyetherimide.

Poly(aryl ether) resins are tough rigid high strength thermoplastics which maintain their properties over a wide temperature range of from −150° F. to above 300° F. They have a high continuous use temperature of about 300° F. They are hydrolytically stable and have excellent mechanical and electrical properties which allows them to be molded into a variety of articles.

Poly(aryl ether) resins are highly resistant to mineral acids, and salt solutions but when exposed to polar organic solvents, they readily stress crack.

Thus, it is desirable to increase the environmental stress crack resistance of poly(aryl ether) resins to make them more acceptable for use in a solvent environment without essentially effecting their mechanical or electrical properties.

It has now been unexpectedly found that the addition of a polyetherimide to a poly(aryl ether) yields compositions which have significantly improved environmental stress crack resistance. Also, surprisingly, the blends of polyetherimide and poly(aryl ether) resins exhibit excellent mechanical compatibility over the entire compositional range. Further, addition of the poly(aryl ether) to the polyetherimide results in improved impact strength of the polyetherimide.

DESCRIPTION OF THE INVENTION

The molding compositions of this invention comprise a blend of a poly(aryl ether) resin and a polyetherimide resin.

The poly(aryl ether) resin may be described as a linear, thermoplastic polyarylene polyether wherein the arylene units are interspersed with ether, sulfone or ketone linkages. These resins may be obtained by reaction of an alkali metal double salt of a dihydric phenol and a dihalobenzenoid or dinitrobenzenoid compound, either or both of which contain a sulfone or a ketone linkage, i.e., $-SO_2-$ or $-CO-$, between arylene groupings, to provide sulfone or ketone units in the polymer chain in addition to arylene units and ether units. The polymer has a basic structure comprising recurring units of the formula $$O-E-O-E'-$$

wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyether resins described in U.S. Pat. No. 3,264,536, the disclosure of which is hereby incorporated herein by reference, for the purpose of describing and exemplifying E and E' in more detail. It is preferred that the dihydric phenol be a weakly acidic dinuclear phenol such as, for example, the dihydroxy diphenyl alkanes or the nuclear halogenated derivatives thereof, such as, for example, the 2,2-bis(4-hydroxyphenyl)propane, 1,1-bis(4-hydroxyphenyl)-2-phenyl ethane, bis(4-hydroxyphenyl)methane, or their chlorinated derivatives containing one or two chlorines on each aromatic ring. While these halogenated bisphenolic alkanes are more acidic than the non-halogenated bisphenols and hence slower in reacting in this process, they do impart valuable flame resistance to these polymers. Other materials also termed appropriately "bisphenols" are also highly valuable and preferred. These materials are the bisphenols of a symmetrical or unsymmetrical joining group, as, for example, ether oxygen (—O—), carbonyl

sulfide (—S—), sulfone

or hydrocarbon residue in which the two phenolic nuclei are joined to the same or different carbon atoms of the residue.

Such dinuclear phenols can be characterized as having the structure:

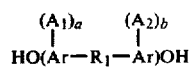

wherein Ar is an aromatic group and preferably is a phenylene group, $A_1$ and $A_2$ can be the same or different inert substituent groups as alkyl groups having from 1 to 4 carbon atoms, halogen atoms, i.e. fluorine, chlorine, bromine or iodine, or alkoxy radicals having from 1 to 4 carbon atoms, a and b are integers having a value from 0 to 4, inclusive, and $R_1$ is representative of a bond between aromatic carbon atoms as in dihydroxydiphenyl, or is a divalent radical, including for example, radicals such as

—O—, —S—, —SO—, —S—S—, —SO$_2$—, and divalent hydrocarbon radicals such as alkylene, alkylidene, cycloalkylene, cycloalkylidine, or the halogen, alkyl, aryl or like substituted alkylene, alkylidene and cycloaliphatic radicals as well as aromatic radicals and rings fused to both Ar groups.

Examples of specific dihydric polynuclear phenols include among others: the bis-(hydroxylphenyl)alkanes such as 2,2-bis-(4-hydroxyphenyl)propane, 2,4'-dihydroxydiphenylmethane, bis-(2-hydroxyphenyl)methane, bis-(4-hydroxyphenyl)methane, bis(4-hydroxy-2,6-dimethyl-3-methoxyphenyl)methane, 1,1-bis-(4-hydroxyphenyl)ethane, 1,2-bis-(4-hydroxyphenyl)ethane, 1,1-bis-(4-hydroxy-2-chlorophenyl)ethane, 1,1-bis-(3-methyl-4-hydroxyphenyl)propane, 1,3-bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxynaphthyl)propane, 2,2-bis-(4-hydroxyphenyl)pentane, 3,3-bis-(4-hydroxyphenyl)pentane 2,2-bis-(4-hydroxyphenyl)heptane, bis- (4-hydroxyphenyl)phenylmethane, 2,2-bis-(4-hydroxyphenyl)-1-phenyl-propane, 2,2-bis-(4-hydroxyphenyl)-1,1,1,3,3,3-hexafluoropropane and the like;

- di(hydroxyphenyl)sulfones such as bis-(4-hydroxyphenyl sulfone, 2,4'-dihydroxydiphenyl sulfone, 5'-chloro-2,4'-dihydroxydiphenyl sulfone, 5'-chloro-4,4'-dihydroxydiphenyl sulfone, and the like.
- di(hydroxyphenyl) ethers such as bis-(4-hydroxyphenyl)ether, the 4,3'-, 4,2'-, 2,2'-, 2,3'-, dihydroxydiphenyl ethers, 4,4'-dihydroxy-2,6-dimethyldiphenyl ether, bis-(4-hydroxy-3-isobutylphenyl) ether, bis-(4-hydroxy-3-isopropylphenyl) ether, bis-(4-hydroxy-3-chlorophenyl) ether, bis-(4-hydroxy-3-fluorophenyl) ether, bis-(4-hydroxy-3-bromophenyl) ether, bis-(4-hydroxynaphthyl) ether, bis-(4-hydroxy 3-chloronapthyl) ether, 4,4'-dihydroxy-3,6-dimethoxydiphenyl ether.

As herein used the E term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through aromatic ether oxygen atoms.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro-group. The dihalobenzenoid or dinitrobenzenoid compound can be either mononuclear where the halogens or nitro-groups are attached to the same benzenoid ring or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

Any electron withdrawing group can be employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev. 49 273 (1951) and Quart. Rev., 12, 1 (1958). See also Taft, *Steric Effects in Organic Chemistry*, John Wiley & Sons (1956), chapter 13; *Chem. Rev.*, 53, 222; *JACS*, 74, 3120; and *JACS*, 75, 4231.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen as in pyridine.

(b) divalent group which can activate displacement of halogens on two different rings, such as the sulfone group

the carbonyl group

the vinylene group

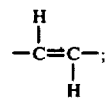

the sulfoxide group

the azo-group —N=N—; the saturated fluorocarbon groups —CF₂CF₂—; organic phosphine oxides

where R₂ is a hydrocarbon group, and the ethylidene group

where X₁ can be hydrogen or halogen and activating groups within the nucleus which can activate halogens as nitro functions on the same ring such as in the case with difluorobenzoquinone, 1,4- or 1,5- or 1,8-difluoroanthraquinone, etc.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The polyarylene polyethers of this invention are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalyst are not necessary for this reaction but the unique facility of these solvents to promote the reaction to a high molecular weight product has now provided the critical tool necessary to secure sufficiently high molecular weight aromatic ether products useful for services heretofore limited to such products as polyformaldehydes and polycarbonates.

The polymers are also prepared in a two-step process in which a dihydric phenol is first converted in situ in the primary reaction solvent to the alkali metal salt by the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol is admixed and reacted with about stoichiometric quantities of the dihalobenzenoid or dinitrobenzenoid compound.

The polymerization reaction proceeds in the liquid phase of a sulfoxide or sulfone organic solvent at elevated temperatures.

A preferred form of the polyarylene polyethers of this invention are those prepared using the dihydric polynuclear phenols of the following four types, including the derivatives thereof which are subsituted with inert substituent groups

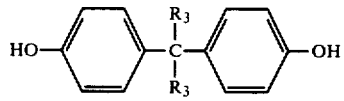
(a)

in which the $R_3$ group represents independently hydrogen, lower alkyl, lower aryl and the halogen substituted groups thereof, which can be the same or different;

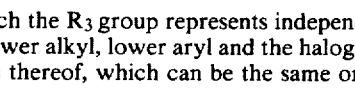
(b)

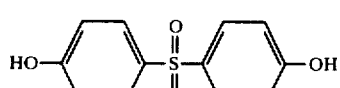
(c)

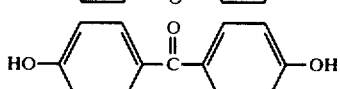
(d)

and substituted derivatives thereof.

It is also contemplated in this invention to use a mixture of two or more different dihydric phenols to accomplish the same ends as above. Thus when referred to above the —E— residuum in the polymer structure can actually be the same or different aromatic residua.

In order to secure the high polymers, the system should be substantially anhydrous, and preferably with less than 0.5 percent by weight water in the reaction mixtures.

The poly(aryl ether)s have a reduced viscosity of from about 0.4 to about 1.5 as measured in an appropriate solvent at an appropriate temperature depending on the particular polyether, such as in methylene chloride at 25° C.

The preferred poly(aryl ether)s have repeating units of the formula:

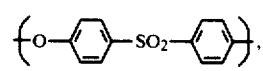

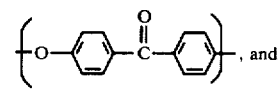

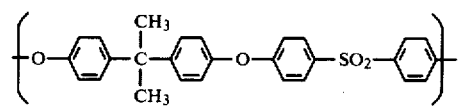

The polyetherimides suitable for use in this invention are well known in the art and described in, for example, U.S. Pat. Nos. 3,847,867, 3,838,097 and 4,107,147.

The polyetherimides are of the following formulae:
The polyetherimides are of the following formulae:

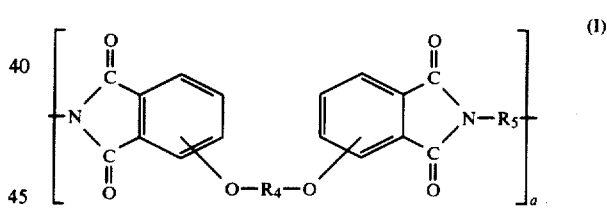
(I)

wherein a is an integer greater than 1, preferably from about 10 to about 10,000 or more, —O—$R_4$—O— is attached to the 3 or 4 and 3' or 4' positions and $R_4$ is selected from (a) a substituted or unsubstituted aromatic radical such as

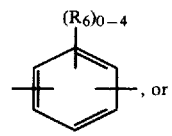

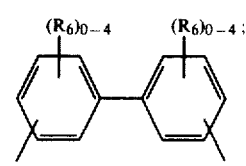

(b) a divalent radical of the formula:

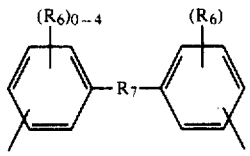

wherein $R_6$ is independently $C_1$ to $C_6$ alkyl, or halogen and $R_7$ is selected from —O—, —S—,

—$SO_2$—, —SO—, alkylene of 1 to 6 carbon atoms, cycloalkylene of 4 to 8 carbon atoms, alkylidene of 1 to 6 carbon atoms or cycloalkylidene of 4 to 8 carbon atoms, $R_5$ is selected from an aromatic hydrocarbon radical having from 6–20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms, $C_2$–$C_8$ alkylene terminated polydiorganosiloxane and a divalent radical of the formula

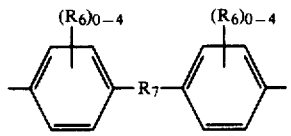

wherein $R_6$ and $R_7$ are as previously defined and $R_7$ may be a direct bond.

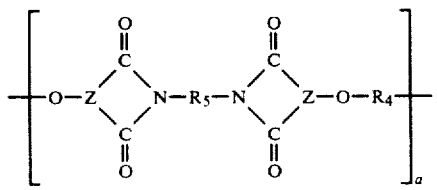

wherein —O—Z< is a member selected from

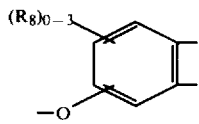

wherein $R_8$ is independently hydrogen, lower alkyl or lower alkoxy

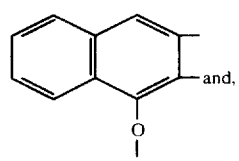

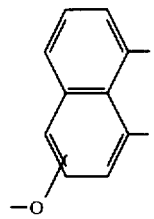

wherein the oxygen may be attached to either ring and located ortho or para to one of the bonds to the anhydride carbonyl group wherein a, $R_4$ and $R_5$ are as previously defined.

These polyetherimides are prepared by methods well known in the art as set forth in, for example, U.S. Pat. Nos. 3,833,544, 3,887,588, 4,017,511, 3,965,125 and 4,024,110.

The polyetherimides of Formula (I) can, for example, be obtained by any of the methods well-known to those skilled in the art including the reaction of any aromatic bis(ether anhydride)s of the formula These polyetherimides are prepared by methods well known in the art as set forth in, for example, U.S. Pat. Nos. 3,833,544, 3,887,588, 4,017,511, 3,965,125 and 4,024,110.

The polyetherimides of Formula (I) by any of the methods well-known to those skilled in the art including the reaction of any aromatic bis(ether anhydride)s of the formula

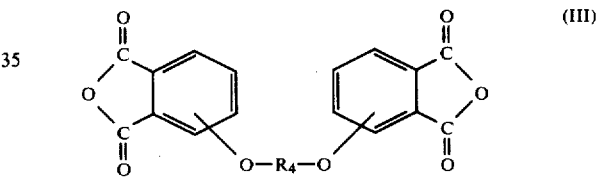

where $R_4$ is as defined hereinbefore, with a diamino compound of the formula $$H_2N-R_5-NH_2 \quad (IV)$$

where $R_5$ is as defined hereinbefore. In general, the reactions can be advantageously carried out employing well-known solvents, e.g., o-dichlorobenzene, m-cresol/toluene, N,N-dimethylacetamide, etc., in which to effect interaction between the dianhydrides and the diamines, at temperatures of from about 20° to about 250° C. Alternatively, the polyetherimides can be prepared by melt polymerization of any dianhydride of Formula III with any diamino compound of Formula IV while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally useful polyetherimides of Formula I have an intrinsic viscosity [η] greater than 0.2 deciliters per gram, preferably 0.35 to 0.60, or 0.7 deciliters per gram or even higher when measured in m-cresol at 25° C.

The aromatic bis(ether anhydride)s of Formula III include, for example, 2,2-bis[4-(2,3-dicarboxyphenoxy)phenyl]-propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)-diphenyl-2,2-propane dianhydride; etc.
and mixtures of such dianhydrides.

The organic diamines of Formula IV include, for example,
m-phenylenediamine,
p-phenylenediamine,
4,4'-diaminodiphenylpropane,
4,4'-diaminodiphenylmethane, benzidine,
4,4'-diaminodiphenyl sulfide,
4,4'-diaminodiphenyl sulfone,
4,4'-diaminodiphenyl ether,
1,5-diaminonaphthalene,
3,3'-dimethylbenzidine,
3,3'-dimethoxybenzidine, The polyetherimides of formula (II) may be prepared for example, by effecting reaction in the presence of a dipolar aprotic solvent of a mixture of ingredients comprising, for instance, (1) a bis(nitrophthalimide) of the general formula:

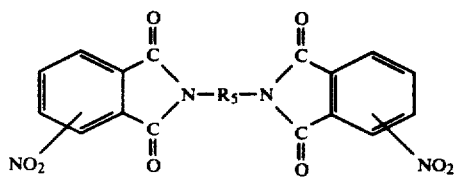

(V)

wherein R$_5$ is defined as hereinabove, and (2) an alkali metal salt of an organic compound of the general formula:

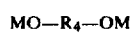

MO—R$_4$—OM  (VI)

wherein M is an alkali metal and R$_4$ is defined as hereinabove.

The bis(nitrophthalimide) used in preparing the polymer is formed by reacting a diamine of the formula described above

NH$_2$—R$_5$—NH$_2$ with a nitro-substituted aromatic anhydride of the formula:

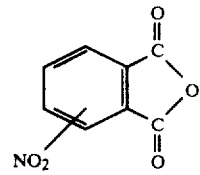

(VII)

The molar ratio of diamine to anhydride should ideally be about 1:2 respectively. The initial reaction product is a bis(amide-acid) which is subsequently dehydrated to the corresponding bis(nitrophthalimide).

The diamines are described, supra.

The preferred nitrophthalic anhydrides useful in the present invention are 3-nitrophthalic anhydride, 4-nitrophthalic anhydride and mixtures thereof. These reactants are commercially available in reagent grade. They may also be prepared by the nitration of phthalic anhydride using procedures described in Organic Syntheses, Collective Vol. I, Wiley (1948), page 408. Certain other closely related nitroaromatic anhydrides may also be used in the reaction and are illustrated for example by 2-nitronaphthalic anhydride, 1-nitro-2,3-naphthalenedicarboxylic anhydride and 3-methoxy-6-nitrophthalic anhydride, and the like.

With reference to the alkali metal salts of formula VI among the divalent carbocyclic aromatic radicals which R$_4$ may represent (mixtures of such radicals are also included) are, for instance, divalent aromatic hydrocarbon radicals of from 6 to 20 carbon atoms, such as phenylene, biphenylene, naphthylene, etc. Included are residues of, e.g. hydroquinone, resorcinol, chlorohydroquinone, etc. In addition, R$_4$ may be a residue of a dihydroxy diarylene compound in which the aryl nuclei are joined by either an aliphatic group, a sulfoxide group, sulfonyl group, sulfur, carbonyl group, oxygen, the —C(CH$_3$) (CH$_2$)$_2$(COOH) group, etc. Typical of such diarylene compounds are the following:

2,4-dihydroxydiphenylmethane;
bis(2-hydroxyphenyl)methane;
2,2-bis(4-hydroxyphenyl)propane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-phenyl-4-hydroxyphenyl)propane;
2,2-bis(3-isopropyl-4-hydroxyphenyl)propane;
2,2-bis(4-hydroxynaphthyl)propane;
hydroquinone;
naphthalene diols;
bis(4-hydroxyphenyl)ether;
bis(4-hydroxyphenyl)sulfide;
bis(4-hydroxyphenyl)sulfone; and the like.

When dialkali metal salts of formula VI are used with the compound illustrated by formula V, the ingredients are advantageously present in an equal molar ratio for optimum molecular weight and properties of the polymer. Slight molar excesses, e.g., about 0.001 to 0.10 molar excess of either the dinitro-substituted organic compound or of the dialkali metal salt of formula may be employed. When the molar ratios are approximately equal, the polymer is substantially terminated by a =Z—NO₂ at one end and a a phenolic group at the other end. If there is a molar excess of one compound, that particular terminal group will predominate.

The conditions of reaction whereby the alkali-metal salt of formula IV is reacted with the dinitro-substituted organic compound of formula III can be varied widely. Generally, temperatures of the order of about 25°–150° C. are advantageously employed, although it is possible to employ lower or higher temperature conditions depending on the ingredients used, the reaction product sought, time of reaction, solvent employed, etc. In addition to atmospheric pressure, superatmospheric pressures and subatmospheric pressures may be employed depending upon the other conditions of reaction, the ingredients used, the speed at which it is desired to effect reaction, etc.

The time of reaction also can be varied widely depending on the ingredients used, the temperature, the desired yield, etc. It has been found that times varying from about 5 minutes to as much as 30 to 40 hours are advantageously employed to obtain the maximum yield and desired molecular weight. Thereafter the reaction product can be treated in the appropriate manner required to effect precipitation and/or separation of the desired polymeric reaction product. Generally, common solvents such as alcohols (e.g. methanol, ethanol, isopropyl alcohol, etc.) and aliphatic hydrocarbons (e.g. pentane, hexane, octane, cyclohexane, etc.) may be employed as precipitants for this purpose.

It is important that the reaction between the dinitro-substituted organic compound of formula III and the alkali-metal salt of formula IV (mixtures of such alkali-metal salts can also be used) be carried out in the presence of a dipolar aprotic solvent.

The polymerization is performed under anhydrous conditions usually using dipolar aprotic solvents such as dimethylsulfoxide which are added in varying amounts depending upon the particular polymerization. A total quantity of solvent, dipolar aprotic solvent or mixture of such solvent with an aromatic solvent sufficient to give a final solution containing 10–20% by weight of polymer is preferably employed.

The preferred polyetherimides include those of the formula:

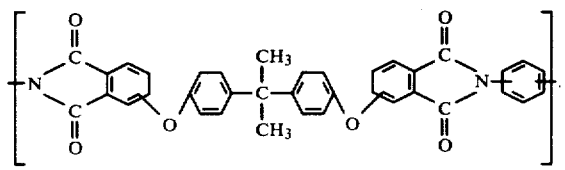

The poly(aryl ether) is used in amounts of from about 95 to about 5, preferably from about 80 to about 20 weight percent. The polyetherimide is used in amounts of from about 5 to about 95, preferably from about 20 to about 80 weight percent.

The compositions of this invention are prepared by any conventional mixing methods. For example, a preferred method comprises mixing the poly(aryl ether) and the polyetherimide in powder or granular form in an extruder and extruding the mixture into strands, chopping the strands into pellets and molding the pellets into the desired article.

It should, of course, be obvious to those skilled in the art that other additives may be included in the present compositions. These additives include plasticizers; pigments; flame retardant additives, particularly, decabromodiphenyl ether and triarylphosphates, such as triphenylphosphate; reinforcing agents, such as glass fibers; thermal stabilizers; ultraviolet light stabilizers, processing aids, impact modifiers and the like.

EXAMPLES

The following examples serve to give specific illustrations of the practice of this invention but they are not intended in any way to limit the scope of this invention.

CONTROL A

Control A was a poly(aryl ether) of the following formula:

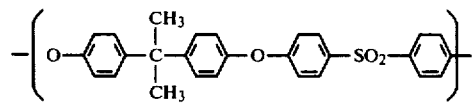

having a reduced viscosity of 0.59 as measured in chloroform (0.2 gram polymer in 100 ml at 25° C.).

The poly(aryl ether) was compression molded at 250° C. in a 4×4×0.020 inch cavity mold. ⅛ inch strips were shear cut from the molded product. These strips were tested for 1% secant modulus according to a procedure similar to ASTM D-638; tensile strength, yield elongation and elongation at break according to ASTM D-638 and pendulum impact strength. Also, samples were placed under the stress shown in Table II. A cotton swab saturated with the chemical environment, as identified in Table II, is attached to the center of the test specimen. The time for the specimen to rupture is then recorded. Additionally the clarity of the sample after molding was recorded.

The results are shown in Tables I and II.

CONTROL B

Control B was a polyetherimide of the following formula:

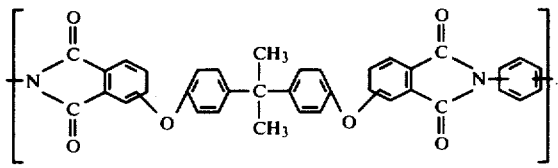

The polyetherimide had a reduced viscosity of 0.51 as measured in chloroform at 25° C.

The polyetherimide was compression molded and tested as described in Control A.

The results are shown in Tables I and II.

EXAMPLE 1

75 weight percent of the poly(aryl ether) of Control A was blended with 25 weight percent of the polyetherimide of Control B in a Brabender blender at about 300° C. The blend was compression molded and tested as described in Control A.

The results are shown in Tables I and II.

EXAMPLE 2

50 weight percent of the poly(aryl ether) of Control A was blended with 50 weight percent of the polyetherimide of Control B in a Brabender blender at about 300° C. The blend was compression molded and tested as described in Control A.

The results are shown in Tables I and II.

EXAMPLE 3

25 weight percent of the poly(aryl ether) of Control A was blended with 75 weight percent of the polyetherimide of Control B in a Brabender blender at about 300° C. The blend was compression molded and tested as described in Control A.

The results are shown in Tables I and II.

and from about 5 to about 95 weight percent of a polyetherimide of the following formulae:

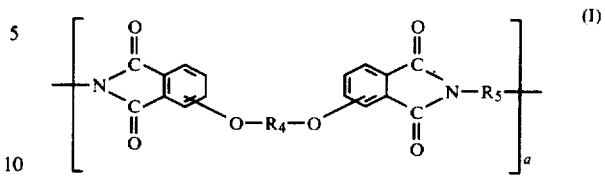

wherein a is an integer greater than 1, to about 10,000 or more, —O—$R_4$—O— is attached to the 3 or 4 and 3' and 4' positions and $R_4$ is selected from (a) a substituted or unsubstituted aromatic radical such as

TABLE I

| Example | Description of the Composition[1] Polymer | Wt. % | Secant 1% Modulus(psi) | Tensile Strength(psi) | Yield Elongation (%) | Elongation at Break (%) | Pendulum Impact Strength (ft-lbs./in.[3]) |
|---|---|---|---|---|---|---|---|
| Control A | PAE | 100 | 270,000 | 10,000 | 6.0 | 50 | 170 |
| Control B | PEI | 100 | 332,000 | 15,200 | — | 8.7 | 13 |
| 1 | PAE | 75 | 280,000 | 9,970 | 5.2 | 14 | 104 |
|  | PEI | 25 |  |  |  |  |  |
| 2 | PAE | 50 | 286,000 | 11,200 | 5.5 | 23 | 155 |
|  | PEI | 50 |  |  |  |  |  |
| 3 | PAE | 25 | 314,000 | 12,800 | 6.7 | 14 | 105 |
|  | PEI | 75 |  |  |  |  |  |

[1]PA = Poly(arylether)
PEI = Polyetherimide

TABLE II

| Example | Description of the Composition Polymer | Wt. % | Chemical Environment | Stress (psi) | Time to Rupture (Sec.) |
|---|---|---|---|---|---|
| Control A | PAE | 100 | Acetone | 500 | 1 |
| 1 | PAE | 75 | Acetone | 500 | 10 |
|  | PEI | 25 |  |  |  |
| 2 | PAE | 50 | Acetone | 500 | 1008 |
|  | PEI | 50 |  |  |  |
| 3 | PAE | 25 | Acetone | 500 | No rupture after 7200 sec. exposure |
|  | PEI | 75 |  |  |  |
| Control A | PAE | 100 | Methyl ethyl ketone | 500 | 1 |
| 1 | PAE | 75 | Methyl ethyl ketone | 500 | 5 |
|  | PEI | 25 |  |  |  |
| 2 | PAE | 50 | Methyl ethyl ketone | 500 | — |
|  | PEI | 50 |  |  |  |
| 3 | PAE | 25 | Methyl ethyl ketone | 500 | No rupture after 7200 sec. exposure[2] |
|  | PEI | 75 |  |  |  |
| Control A | PAE | 100 | Toluene/Heptane[1] | 2000 | 35 |
| 1 | PAE | 75 | Toluene/Heptane[1] | 2000 | 65 |
|  | PEI | 25 |  |  |  |
| 2 | PAE | 50 | Toluene/Heptane[1] | 2000 | 792 |
|  | PEI | 50 |  |  |  |
| 3 | PAE | 25 | Toluene/Heptane[1] | 2000 | No rupture after 7200 sec. exposure[3] |
|  | PEI | 75 |  |  |  |
| Control A | PAE | 100 | Isopropanol | 4000 | 480 |
| 1 | PAE | 75 | Isopropanol | 4000 | — |
|  | PEI | 25 |  |  |  |
| 2 | PAE | 50 | Isopropanol | 4000 | 13,860 |
|  | PEI | 50 |  |  |  |

[1]The toluene/heptane solution was a 50/50 mixture by volume
[2]The sample was not crazed but was brittle
[3]The sample was not crazed nor brittle

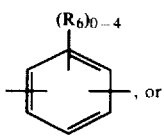

What is claimed is:

1. A molding composition comprising a blend of from about 95 to about 5 weight percent of a poly(aryl ether)

-continued

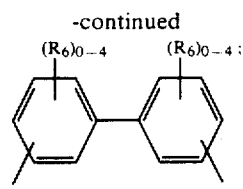

(b) a divalent radical of the formula:

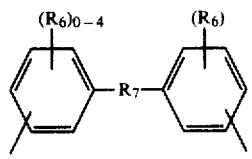

wherein $R_6$ is independently $C_1$ to $C_6$ alkyl, or halogen and $R_7$ is selected from —O—,

alkylene of 1 to 6 carbon atoms, cycloalkylene of 4 to 8 carbon atoms, alkylidene of 1 to 6 carbon atoms or cycloalkylidene of 4 to 8 carbon atoms, $R_5$ is selected from an aromatic hydrocarbon radical having from 6–20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms, $C_2$–$C_8$ alkylene terminated polydiorganosiloxane and a divalent radical of the formula

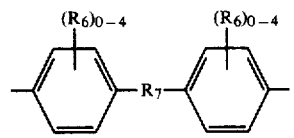

wherein $R_6$ and $R_7$ are as previously defined and $R_7$ may be a direct bond;

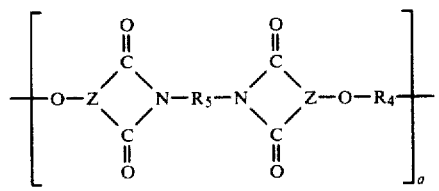

(II)

wherein —O—Z< is a member selected from

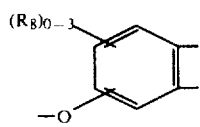

(a)

wherein $R_8$ is independently hydrogen, lower alkyl or lower alkoxy

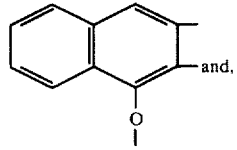

(b)

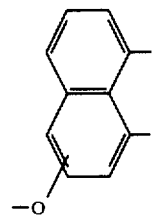

(c)

wherein the oxygen may be attached to either ring and located ortho or para to one of the bonds to the anhydride carbonyl group wherein a, $R_4$ and $R_5$ are as previously defined.

2. A molding composition as defined in claim 1 wherein the poly(aryl ether) has recurring units of the formula:

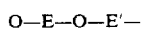

wherein E is the residuum of the dihydric phenol and E' is the residuum of the benzenoid compound having an inert electron withdrawing group in at least one of the positions ortho and para to the valence bonds wherein both of said residuum are valently bonded to the ether oxygens through aromatic carbon atoms.

3. A molding composition as defined in claim 1 wherein the poly(aryl ether) has repeating units of the formula:

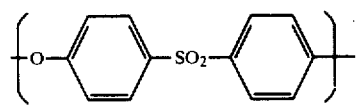

4. A molding composition as defined in claim 1 wherein the poly(aryl ether) has repeating units of the formula:

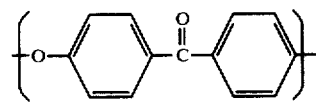

5. A molding composition as defined in claim 1 wherein the poly(aryl ether) has repeating units of the formula:

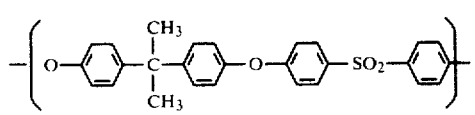

6. A composition as in claim 1 wherein the polyetherimide is of the following formulae:

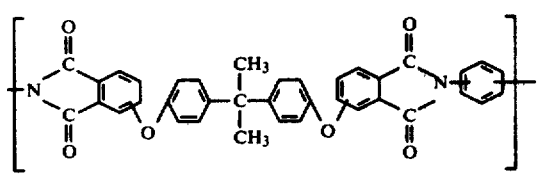

7. A molding composition as defined in claim 1 wherein the poly(aryl ether) is used in amounts of from about 80 to about 20 weight percent.

8. A molding composition as defined in claim 1 wherein the polyetherimide is used in amounts of from about 20 to about 80 weight percent.

9. A molding composition as defined in claim 1 wherein the poly(aryl ether) is used in amounts of from 25 to 75 weight percent and the polyetherimide is used in amounts of from 75 to 25 weight percent.

* * * * *